United States Patent [19]

Zerillo

[11] E Patent Number: Re. 33,038

[45] Reissued Date of Patent: Aug. 29, 1989

[54] DOT MATRIX PRINTING SYSTEM

[75] Inventor: Samuel D. Zerillo, Hillsborough, N.H.

[73] Assignee: Genicom Corporation, Waynesboro, Va.

[21] Appl. No.: 151,300

[22] Filed: Feb. 1, 1988

Related U.S. Patent Documents

Reissue of:

[64] Patent No.: 4,568,209
Issued: Feb. 4, 1986
Appl. No.: 542,525
Filed: Oct. 17, 1983

[51] Int. Cl.[4] ..... B41J 35/10

[52] U.S. Cl. ..... 400/216.1; 400/212

[58] Field of Search ..... 400/211, 212, 215–215.4, 400/216–216.6

[56] References Cited

U.S. PATENT DOCUMENTS

| | | | |
|---|---|---|---|
| 3,899,065 | 8/1975 | Brignole | 400/216 |
| 4,368,993 | 1/1983 | Brass et al. | 400/216.2 |
| 4,395,148 | 7/1983 | Gruner et al. | 400/212 |
| 4,407,594 | 10/1983 | Link | 400/212 |

FOREIGN PATENT DOCUMENTS

| | | | |
|---|---|---|---|
| 136384 | 10/1981 | Japan | 400/212 |
| 138973 | 8/1982 | Japan | 400/212 |
| 78883 | 5/1984 | Japan | 400/212 |

OTHER PUBLICATIONS

IBM Technical Disclosure Bulletin, "Misalignment Correction for Ribbon Lift Mechanism" by Burdett et al., vol. 26, No. 3A 8-83, pp. 1159-1160.

*Primary Examiner*—William Pieprz
*Attorney, Agent, or Firm*—Nixon & Vanderhye

[57] ABSTRACT

In the dot matrix printer disclosed herein, a multicolor ribbon is shifted to bring different colored stripes in alignment with the nosepiece of a dot matrix printhead by means of cup-like ribbon guide members journaled on either side of the nosepiece. Each guide member provides, in its periphery, an arcuate slot through which the ribbon can freely slide as the printhead traverses. A stepping motor is coupled to the guide members for rotating them so as to selectively bring a stripe of desired color into operative position.

5 Claims, 3 Drawing Sheets

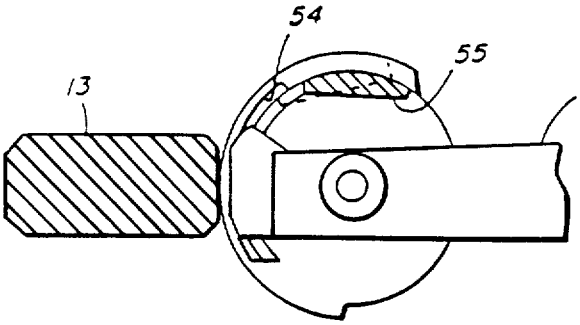
FIG. 2
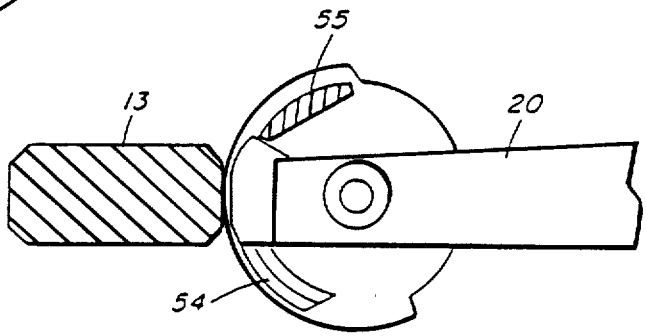
FIG. 3
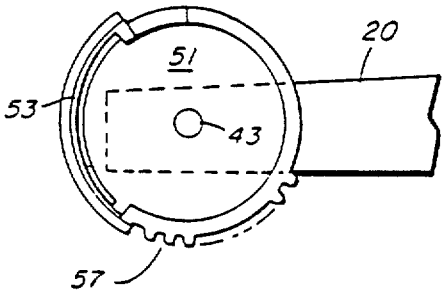
FIG. 4
FIG. 5
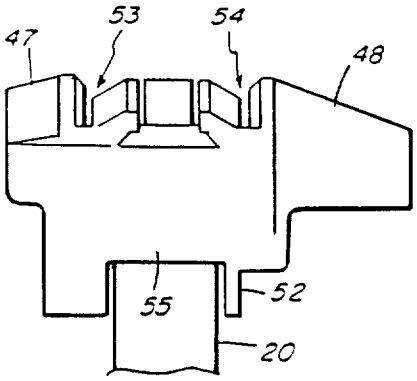
FIG. 6
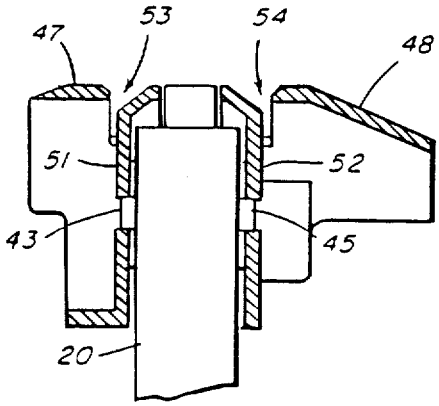

DOT MATRIX PRINTING SYSTEM

Matter enclosed in heavy brackets [ ] appears in the original patent but forms no part of this reissue specification; matter printed in italics indicates the additions made by reissue.

BACKGROUND OF THE INVENTION

The present invention relates to [multicolor] *a* printing *ribbon system* and more particularly to a dot matrix printer in which a traversing printhead carries rotary guide means for shifting a multicolor ribbon so as to bring a stripe of desired color into alignment with the operative face of the printhead nosepiece.

While the prior art comprises many varieties of ribbon shifters, i.e. those commonly employed in typewriters, relatively few of these systems have been suitable for use in a dot matrix printer, particularly a high speed dot matrix printer of the type in which the printhead is traversed along a length of ribbon supported by stationary ribbon holding means generally parallel to a printing platen.

Among the several objects of the present invention, may be noted the provision of a novel multicolor dot matrix printer; the provision of such a printer which will operate at high speed; the provision of such a printer which employs a stationary ribbon holding means in which a length of ribbon is supported generally parallel to a printing platen with the printhead traversing that length during printing; the provision of such a printer which permits changing of color within a line of print; the provision of such a system in which the ribbon may be easily changed or replaced; the provision of such a system which is highly reliable and which is of relatively simple and inexpensive construction. Other objects and features will be in part apparent and in part pointed out hereinafter.

BRIEF DESCRIPTION OF THE DRAWING

FIG. 2 is a side view, with parts broken away, showing the ribbon shifting mechanism employed in the apparatus of FIG. 1;

FIG. 3 is a view similar to FIG. 2 showing the ribbon shifted to a different position or color;

FIG. 4 is a side view of the ribbon shifting mechanism showing a drive gear incorporated therein;

FIG. 5 is a top view of the ribbon shifting mechanism;

FIG. 6 is a top view, similar to FIG. 5, with parts broken away;

Corresponding reference characters indicate corresponding parts throughout the several views of the drawings;

DESCRIPTION OF THE PREFERRED EMBODIMENT

Figure 1:
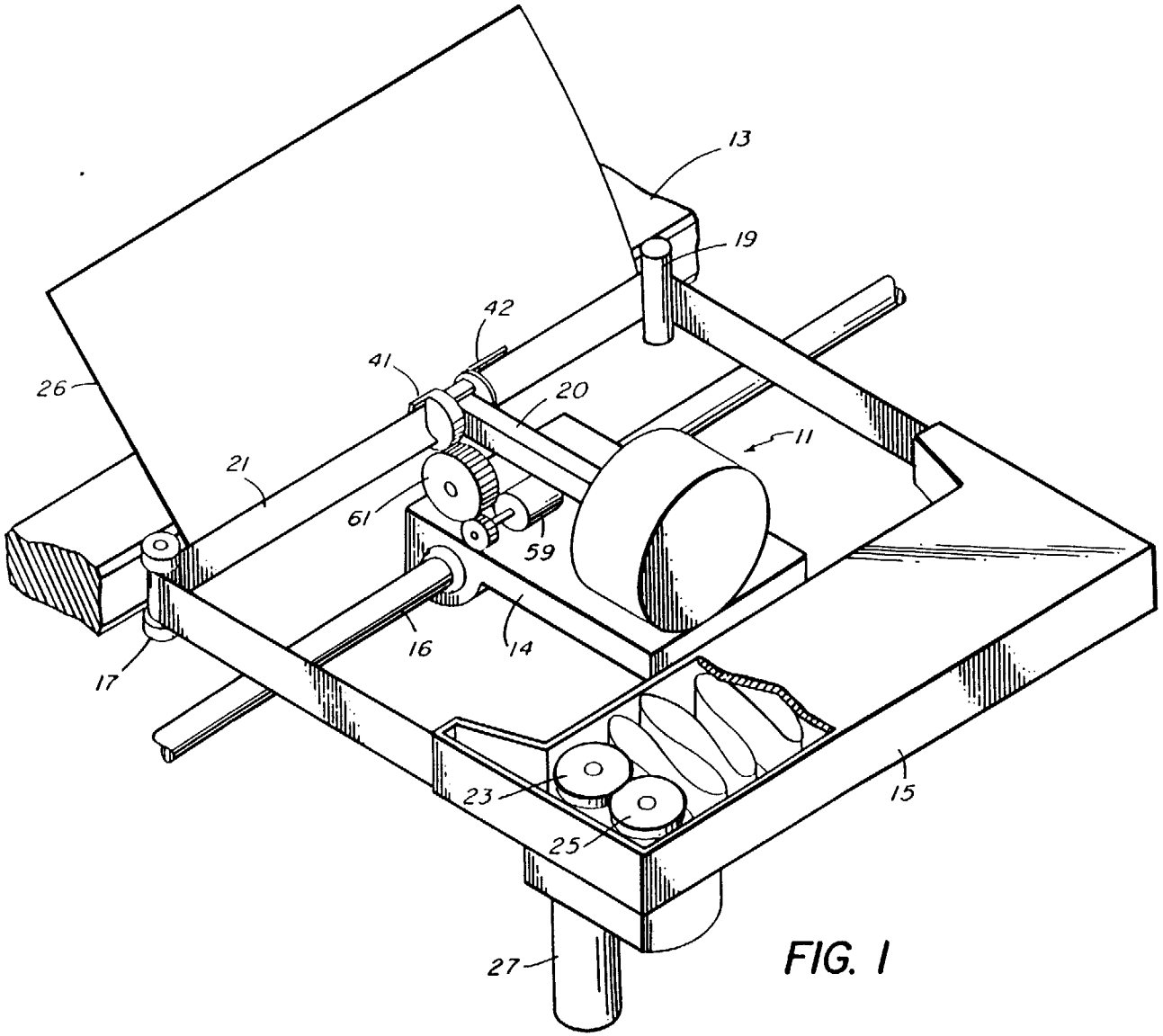
FIG. 1 is a diagramatic view in perspective showing a multicolor dot matrix printer employing a ribbon shifting system constructed in accordance with the present invention.
Figure 7:
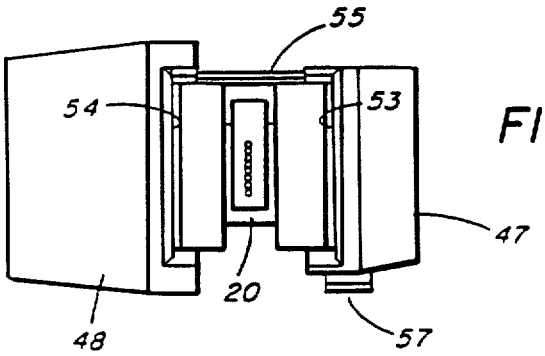
FIG. 7 is a face-on view of the printhead with the ribbon shifting mechanism.

Referring now to FIG. 1, the printer illustrated there is of the high-speed type in which a dot matrix printhead 11 is traversed back and forth along an elongate platen 13. For this purpose, the printhead 11 is mounted on a carriage 14 which runs on a plurality of guides, one of which is indicated by reference character 16. Printhead 11 is of generally conventional construction and includes a rear housing 18 which contains the usual magnetic drivers and a nosepiece 20 through which needlelike print wires are guided with their operative ends adjacent the platen. As in understood by those skilled in the art, the nosepiece terminates in a jewel assembly through which the operative ends of the pins can project in a closely spaced array suitable for dot matrix printing. In the preferred embodiment illustrated the platen 13 is a fixed bar, but it should be understood that a rotary platen might also be employed. The printer employs stationary ribbon holding means including a random pack ribbon cartridge 15 and guides 17 and 19 which position a length of the ribbon, designated by a reference character 21, in a position generally parallel to the platen 13. As is conventional, the ribbon cartridge 15 employs a pair of pinch rollers 23 and 25 which draw the ribbon through the printing system and then pack it back into the cartridge 15, the ribbon itself being formed as an endless loop. Rollers 23 and 25 are driven, through a separable coupling (not shown) by a motor and gear assembly 27 which are part of the printer itself rather than the ribbon cartridge.

To effect printing, e.g., on a web of paper 26 overlying the platen 13, the printhead is traversed, e.g., by a suitable servo mechanism (not shown), and the printhead pins are actuated at time intervals thereby to effect printing on the paper, through the ribbon 21. As is now conventional in modern printing devices, the coordination and timing of these actions is coordinated by a digital controller employing a microcomputer.

Figure 8:
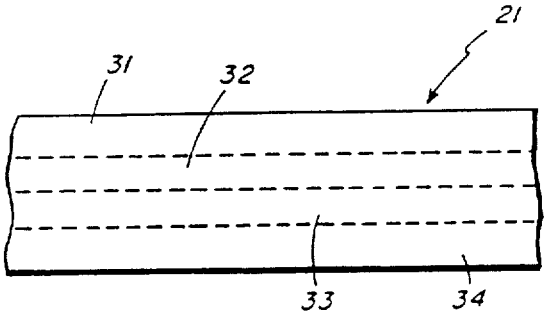
FIG. 8 is a diagramatic illustration of a multicolor ribbon of the type employed in conjunction with the present invention.

In providing multicolor printing, the present invention employs a multicolor ribbon comprising parallel stripes of different colors. Such a ribbon is illustrated diagramatically and in FIG. 8, the stripes of different colors being designated by reference characters 31–34. To position a stripe of selected color in alignment with the face of the printhead, the present invention employs a rotary ribbon guide illustrated in greater detail in FIGS. 2–7.

The ribbon shifting mechanism of the present invention comprises a pair of cup-like guide members 41 and 42, one on each side of the printhead nosepiece 20. As may be seen from the drawings, each of the guide members 41 and 42 comprises a roughly cylindrical wall portion, 47 and 48 respectively, and a disc-like base or bottom portion 51 and 52 respectively. The wall portions 47 and 48 are not continuously joined to the respective base or bottom portions 51 and 52, but rather they are left unjoined over a portion of the periphery of the base thereby to form an arcuate slot on each side, these slots being designated by reference characters 53 and 54 respectively. The length of each slot corresponds to the width of the ribbon 21. It is through these slots which the ribbon passes and is guided past the nosepiece of the printhead. To facilitate guiding of the ribbon, the wall portions are in fact somewhat tapered or conical (as may be seen). The nosepiece itself provides, on each side, a short pin or boss, 43 and 45 respectively. Each pin is received in an opening in the base portion of the respective cup-like guide member and acts as a pivotal mount. The two guide members 41 and 42 are joined by a web 55 so that they rotate together and, preferably the entire guide assembly, including both guide members 41 and 42, is preferably cast as a unitary structure from a suitable synthetic resin or plastic.

As may best be seen in FIG. 4, the guide member 41 includes, along a portion of the periphery of the base portion 51, a plurality of gear teeth 57. As may be seen in FIG. 1, the carriage 14 carries a stepper motor 59 which, through an intermediate gear 61, the gear teeth 57. Accordingly, the stepper motor can control the rotary position of the guide members 41 and 42 to change which portion of the ribbon 21 is actually in front of the operative portion of the nosepiece.

To facilitate changing of the ribbon, it is also contemplated that the guide assembly be replaced with the ribbon and that the ribbon be threaded through the slots 53 and 54 upon initial manufacture of the ribbon cartridge 15. Installation of the guide assembly is then accomplished by merely springing or bending the assembly e.g., across the web 55 so as to permit it to snap over the boss elements 43 and 45 on the nosepiece. Not only does this method simplify the changing of the ribbon upon depletion of the ink impregnated therein, but it also provides for simultaneous replacement of the guide members 41 and 42 which are subject to appreciable wear as the head 18 is traversed back and forth along the ribbon during printing.

While the guide assembly comprising both guide members 41 and 42 is shown constructed as an integral assembly, that is the two guide members are connected by the web 55, it should be understood that separate guide members independently journaled on either side of the nosepiece might also be used if separate coupling from the stepper motor were if independent coupling from the stepper motor were provided on each side.

In order to establish a reference position from which subsequent shifts or color changes can be based, the initial start-up sequence of the printer system, preferably includes a stage wherein the stepper motor is overdriven in one direction so as to drive the web 55 up against the nosepiece itself, i.e. as illustrated in FIG. 3. This will cause the stepping motor to stall and miss steps so that subsequent steps in the reverse direction will be working from a known reference position, i.e., the top stripe of the ribbon. As is understood by those skilled in the art, the stepper motor can thereafter be operated in open loop fashion to reliably position the different colored stripes.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In a dot matrix printer of the type having an elongate platen, a printhead having a projecting nosepiece through which a plurality of print pins are journaled, and means for travesing said printhead along said platen and selectively actuating said pins to effect printing on a web overlying said platen; a [multicolor] ribbon system comprising:

a [multicolor] ribbon having [parallel strips of different colors] *a plurality of portions;* stationary ribbon holder means for holding a substantial quantity of said ribbon and for positioning a length of said ribbon generally parallel to said platen;

pivot pin means on each side of said nosepiece *for serving as a pivotable mount;* shiftable ribbon guide *member* means including, on each side of said nosepiece, a disk-like base portion and a cylindrical wall means *for guiding said ribbon*, each wall means being attached to said base portion at spaced locations thereby to form an arcuate slot therebetween, the length of each slot being substantially equal to the width of the ribbon, the base portions being centrally apertured to receive said *pivot* pin [portions] *means;* gear tooth means on [the periphery of at least one of said base portions;] *said shiftable ribbon guide member* means *for enabling the guide member means to be rotated*; and selectively energizable stepper motor means *for driving said gear tooth means* including gear means engagable with said gear tooth means for rotating said guide [members] *member means* thereby to roll different [stripes] *portions* of said ribbon into alignment with said print pins.

2. A ribbon system as set forth in claim 1 wherein said guide [members] *member means on each side of said nosepiece* are linked by a *connecting* web for movement together.

3. A ribbon system as set forth in claim 2 wherein said [members] *member means* and said *connecting* web are integral.

4. In a dot matrix printer of the type having an elongate platen, a printhead having a projecting nosepiece through which a plurality of print pins are journaled, and means for traversing said printhead along said platen and selectively actuating said pins to effect printing on a web overlying said platen; a [multicolor] ribbon system comprising:

a [multicolor] ribbon having [parallel strips of different colors] *a plurality of parallel portions;* stationary ribbon holder means for holding a substantial quantity of said ribbon and for positioning a length of said ribbon generally parallel to said platen;

pivot pin means on each side of said nosepiece *for serving as a pivotable mount;* shiftable ribbon guide means including, on each side of said nosepiece, a disk-like base portion and a tapered cylindrical wall portion, each wall portion being attached to the respective base portion at spaced locations thereby to form an arcuate slot, the length of each slot being substantially equal to the width of the ribbon with the ribbon passing through said slots, the base portions being centrally apertured to receive said pin portions, said guide means including an integral *connecting* web linking the portions on each side of said nosepiece;

gear tooth means on [the periphery of one of said base portions] *said shiftable ribbon guide means for enabling the ribbon guide means to be rotated*; and selectively energizable stepper motor means *for driving said gear tooth means* including gear means engagable with said gear tooth means for rotating said guide [members] *means* thereby to roll different [stripes] *portions* of said ribbon into alignment with said print pins.

5. A replaceable ribbon assembly for use in a dot matrix printer of the type in which a printhead is traversed along a platen to produce a line of print, the printhead carrying a projecting nosepiece through which a plurality of print pins are journaled, said ribbon assembly comprising:

an endless ribbon having [parallel stripes of different colors] *a plurality of portions, each of which is alignable with said print pins;* a cartridge holding a substantial quantity of said ribbon with a loop extending outside of said cartridge;

a ribbon guide comprising a pair of cup-like sections, each of which includes a cylindrical wall portion and a disk-like base portion, the base portion being spaced apart to receive the printhead nosepiece therebetween with the respective cylindrical wall portions extending in opposite directions, each wall portion being attached to the respective base portion at spaced locations thereby to form an arcuate slot, the ribbon loop passing through said slots, the base portions being centrally apertured to receive pivot pins carried by the printhead nosepiece, at least one of said disk-like base portions being provided with gear tooth means [around a portion of its periphery] *on said ribbon guide for enabling said ribbon guide to be rotated,* whereby motor driven gear means *for engaging said gear tooth means, and* carried by a printhead can roll said ribbon around the printhead nosepiece thereby to bring different [stripes] *portions of said ribbon* into alignment with the print pins.

* * * * *